(12) United States Patent
Dumitru

(10) Patent No.: US 10,562,574 B2
(45) Date of Patent: Feb. 18, 2020

(54) SLIDER FOR TRACK ASSEMBLY OF MACHINE

(71) Applicant: Caterpillar Inc., Peoria, IL (US)

(72) Inventor: Mircea Dumitru, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 542 days.

(21) Appl. No.: 15/259,527

(22) Filed: Sep. 8, 2016

(65) Prior Publication Data

US 2018/0065691 A1 Mar. 8, 2018

(51) Int. Cl.
| | | |
|---|---|---|
| *B62D 55/084* | (2006.01) | |
| *B62D 55/10* | (2006.01) | |
| *E02F 3/30* | (2006.01) | |
| *B62D 55/06* | (2006.01) | |

(52) U.S. Cl.
CPC ....... *B62D 55/0847* (2013.01); *B62D 55/084* (2013.01); *B62D 55/10* (2013.01); *B62D 55/06* (2013.01); *E02F 3/308* (2013.01)

(58) Field of Classification Search
CPC ...... B62M 27/02; B62D 55/10; B62D 55/084; B62D 55/0847
See application file for complete search history.

(56) References Cited

U.S. PATENT DOCUMENTS

| | | | |
|---|---|---|---|
| 3,857,616 A | 12/1974 | Tucker et al. | |
| 4,229,053 A | 10/1980 | Cline | |
| 5,139,317 A | 8/1992 | Larson et al. | |
| 5,941,326 A * | 8/1999 | Fleuchaus | B62D 55/0847 180/9.1 |
| 6,155,656 A | 12/2000 | Gulla | |
| 7,011,126 B2 * | 3/2006 | Heinen | B60C 11/032 152/154.2 |
| 9,004,618 B1 | 4/2015 | Delisle et al. | |
| 9,050,888 B2 | 6/2015 | Gettings et al. | |
| 9,199,694 B2 * | 12/2015 | Handfield | B62M 27/02 |
| 2006/0070758 A1 | 4/2006 | Ryan et al. | |
| 2015/0081166 A1 | 3/2015 | Diekevers et al. | |
| 2015/0101391 A1 | 4/2015 | Kita et al. | |

(Continued)

FOREIGN PATENT DOCUMENTS

| | | |
|---|---|---|
| CN | 2606043 | 3/2004 |
| CN | 204279681 | 4/2015 |

(Continued)

*Primary Examiner* — Scott A Browne
(74) *Attorney, Agent, or Firm* — Oblon, McClelland, Maier & Neustadt

(57) ABSTRACT

A slider for a track assembly of a machine is provided. The slider includes an elongated base portion coupled to a frame and a sliding portion extending from the elongated base portion. The sliding portion includes an outer surface configured to slidably engage with a track link of the track assembly. The sliding portion includes a set of wear indicators defined in the outer surface. The set of wear indicators includes a first wear indicator and a second wear indicator. The first and the second wear indicators are located at a first predefined thickness and a second predefined thickness respectively, measured along a central axis of the sliding portion. Further, the first wear indicator indicates partial wear of the sliding portion and the second wear indicator indicates substantial wear of the sliding portion.

12 Claims, 5 Drawing Sheets

(56) References Cited

U.S. PATENT DOCUMENTS

| | | | |
|---|---|---|---|
| 2015/0130268 A1* | 5/2015 | Scheuerman | B62D 55/15 305/116 |
| 2015/0266527 A1 | 9/2015 | Akinlua et al. | |
| 2015/0353152 A1 | 12/2015 | Hakes et al. | |

FOREIGN PATENT DOCUMENTS

| | | |
|---|---|---|
| JP | 2012144141 | 8/2012 |
| WO | 2007128068 | 11/2007 |

\* cited by examiner

SLIDER FOR TRACK ASSEMBLY OF MACHINE

TECHNICAL FIELD

The present disclosure generally relates to a track assembly of a machine and more particularly to a slider for the track assembly.

BACKGROUND

Various mining and construction machines, such as tractors, electric rope shovels and bulldozers commonly use undercarriage track assembly to propel the machine. The undercarriage track assembly includes ground engaging members known as track shoes connected to each other to form a track link. The undercarriage track assembly also includes multiple sliders for movably supporting and guiding the track link. During operation of the machine, the track link transmits torque from drive wheels of the track assembly into a ground surface. The track link slide over a top surface of the sliders. Over a period of time, the top surface of the sliders wears. Accordingly, it is important to periodically monitor the wear of the top surface of the slider. Conventionally, the track link is dismantled to monitor or measure the wear of the slider, which is a cumbersome process and a time consuming process.

U.S. Pat. No. 9,199,694 (the '694 patent) describes a slide bar of a snowmobile or an all-terrain vehicle. Specifically, the '694 patent discloses a slide bar for the track system that includes one or more colored, or otherwise visually distinctive, wear indicating marks. The wear indicating marks extend longitudinally along at least one of the side walls, and are fastened by fasteners. The wear indicating marks generally provide an indication to the operator of the vehicle that the slide bar needs to be replaced. However the '694 patent fails to disclose a system which is easy and cost effective to indicate wear of the slide bar.

SUMMARY OF THE DISCLOSURE

In one aspect of the present disclosure, a slider for a track assembly of a machine is provided. The slider includes an elongated base portion configured to couple to a frame of the track assembly. The slider also includes a sliding portion extending from the elongated base portion. The sliding portion includes an outer surface configured to slidably engage with a track link of the track assembly. The sliding portion also includes a set of wear indicators defined in the outer surface. The set of wear indicators includes a first wear indicator and a second wear indicator located in the outer surface. Each of the first wear indicator and the second wear indicator is located in the outer surface based on a first predefined thickness and a second predefined thickness, respectively, along a central axis of the sliding portion. The second predefined thickness is greater than the first predefined thickness. The first wear indicator indicates partial wear of the sliding portion and the second wear indicator indicates substantial wear of the sliding portion.

In another aspect of the present disclosure, a slider for a track assembly of a machine is provided. The slider includes an elongated base portion configured to couple to a frame of the track assembly. The slider also includes a sliding portion extending from the elongated base portion. The sliding portion includes a first side surface, a second side surface opposite to the first side surface, and an arcuate surface extending between the first side surface and the second side surface. The first side surface, the second side surface, and the arcuate surface are configured to slidably engage with a track link of the track assembly. The sliding portion also includes a first set of wear indicators and a second set of wear indicators defined in at least one of the first side surface, the second side surface, and the arcuate surface. The first set of wear indicators and the second set of wear indicators are defined proximal to a first end and a second end, respectively, of the sliding portion. Each of the first set of wear indicators and the second set of wear indicators includes a first wear indicator and a second wear indicator located based on a first predefined thickness and a second predefined thickness, respectively, measured with respect to the arcuate surface along a central axis of the sliding portion. The second predefined thickness is greater than the first predefined thickness. The first predefined thickness indicates partial wear of the sliding portion and the second predefined thickness indicates substantial wear of the sliding portion.

In yet another aspect of the present disclosure, a track assembly for a machine is provided. The track assembly includes a frame, and a track link movable around the frame. The track assembly also includes a slider coupled to the frame, and slidably engaged with a plurality of shoe pad of the track link. The slider includes an elongated base portion configured to couple to the frame and a sliding portion extending from the elongated base portion. The sliding portion includes an outer surface configured to slidably engage with the track link. The sliding portion also includes a set of wear indicators defined in the outer surface thereof. The set of wear indicators includes a first wear indicator and a second wear indicator. The first wear indicator and the second wear indicator are located based on a first predefined thickness and second predefined thickness, respectively, measured along a central axis of the sliding portion. The second predefined thickness is greater than the first predefined thickness. The first wear indicator indicates partial wear of the sliding portion and the second wear indicator indicates complete wear of the sliding portion.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. More-over, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
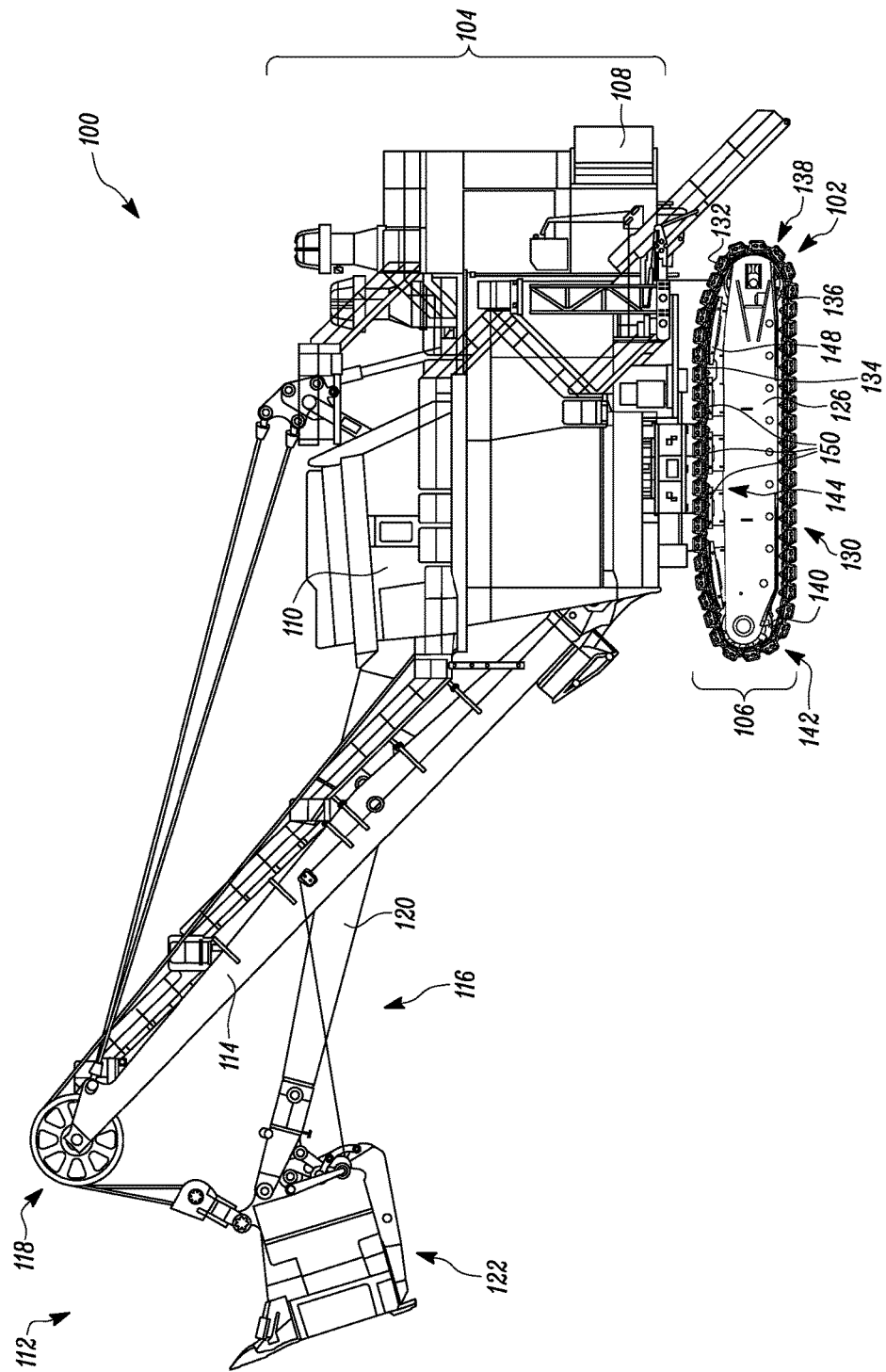
FIG. 1 is a side view of a machine equipped with a track assembly.

Referring to FIG. 1, a side view of a machine 100 having a track assembly 102, according to an embodiment of the present disclosure, is illustrated. In the illustrated embodiment, the machine 100 is embodied as an Electric Rope Shovel (ERS) having the track assembly 102. Although embodiments of the present disclosure are disclosed in conjunction with the ERS, it will be appreciated that the embodiments of the present disclosure disclosed herein can be similarly applied to other types of machines such as but not limited to, a hydraulic shovel and a dragline excavator having the track assembly 102. More specifically, the present disclosure may be applicable to any tracked machines. The machine 100 includes a body 104 that is operatively coupled to an undercarriage system 106. The body 104 is configured to one of mount and supports various components, such as a power source 108, an operator cabin 110, and an implement system 112 of the machine 100. The implement system 112 of the machine 100 includes a boom 114 pivotally coupled to the body 104 and configured to extend upwardly and outwardly from the body 104. The implement system 112 also includes a crowd mechanism 116 and a hoist mechanism 118 provided on the boom 114. The crowd mechanism 116 includes a handle 120 configured to move with respect to the boom 114. The handle 120, coupled to an implement 122 may include a dipper or a bucket. The undercarriage system 106 of the machine 100 is a structural unit that may enable movements of the machine 100 over a ground surface. The body 104 of the machine 100 may be rotatably coupled to the undercarriage system 106. The undercarriage system 106 includes the track assembly 102. The track assembly 102 engages with the ground surface to propel the machine 100 over the ground surface. The track assembly 102 propels the machine 100 based on a driving power received from the power source 108.

The track assembly 102 includes a frame 126 configured to support various components of the track assembly 102. The track assembly 102 includes a track link 130 slidably supported on the frame 126. Further, the track link 130 is movable around the frame 126. The track link 130 includes a plurality of shoe pads 131 which are pivotally coupled with each other to form a continuous link around the frame 126 of the track assembly 102. Each of the plurality of shoe pads 131 includes an upper surface 132 configured to engage with the ground surface and a lower surface 134 facing towards the frame 126 of the track assembly 102. Each of the plurality of shoe pads 131 is pivotally coupled with each other by a pin 135 (shown in FIG. 5) and a bushing (not shown) assembly. The track assembly 102 further includes a drive wheel 136 coupled at a first end 138 of the frame 126. The drive wheel 136 is configured to receive the driving power from the power source 108. The track assembly 102 further includes an idler wheel 140 coupled to a second end 142 of the frame 126. The idler wheel 140 is configured to rotatably support the track link 130.

The track assembly 102 further includes a plurality of sliders 144 coupled to the frame 126 to support a portion of the track link 130 defined between the drive wheel 136 and the idler wheel 140. The plurality of sliders 144 is slidably engaged with each of the plurality of shoe pads 131 of the track link 130. In the illustrated embodiment, the plurality of sliders 144 includes a first slider 148 disposed adjacent to each of the drive wheel 136 and the idler wheel 140 and a set of second sliders 150 disposed between the pair of first sliders 148. The drive wheel 136 may transfer driving torque to the track link 130. The idler wheel 140 and the plurality of sliders 144 guide the track link 130 around the frame 126.

Figure 2:
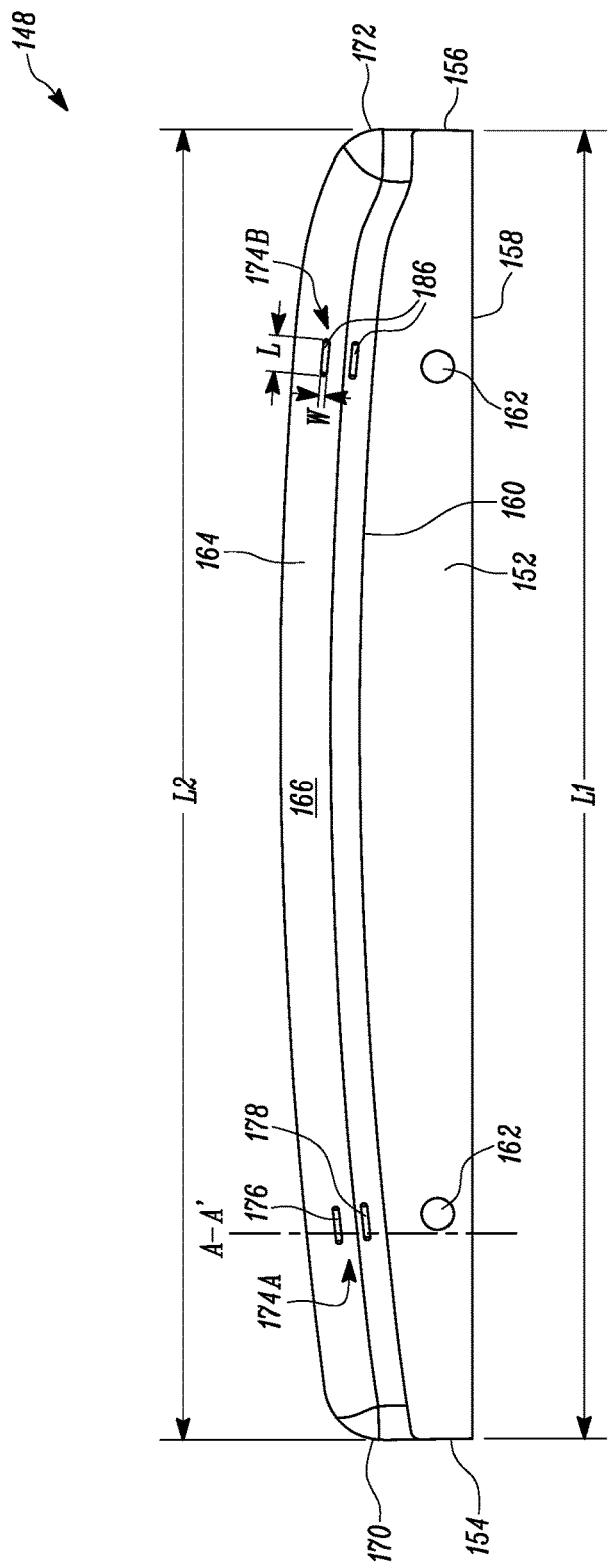
FIG. 2 is a side view of a slider of the track assembly of FIG. 1 equipped with wear indicators, according to an embodiment of the present disclosure.

Referring to FIG. 2, a side view of one of the pair of first sliders 148 is illustrated. The first slider 148 is hereinafter referred to as the 'slider 148' for description purpose of the present disclosure. The slider 148 includes an elongated base portion 152 having a length "L1" defined between a first end 154 and a second end 156. In an example, the length "L1" of the elongated base portion 152 may be defined based on a distance between the drive wheel 136 and the idler wheel 140 on the frame 126. More specifically, the elongated base portion 152 may include a bottom end 158 configured to couple to the frame 126 and a top end 160 distal to the bottom end 158.

A height of the elongated base portion 152 may be defined between the bottom end 158 and the top end 160. In an example, the height of the elongated base portion 152 may be defined based on various parameters including, but not limited to, a mounting height of the drive wheel 136 and the idler wheel 140 on the frame 126, and a lag in the portion of the track link 130 between the drive wheel 136 and the idler wheel 140. The elongated base portion 152 includes a pair of through holes 162 for receiving fastening members (not shown).

The elongated base portion 152 is coupled to the frame 126 using the fastening members. During assembly of the slider 148 with the frame 126, the pair of through holes 162 of the slider 148 may be aligned with corresponding holes (not shown) in the frame 126 such that the fastening members, such as bolt, may be received through the through holes 162 of the sliders 144 and the corresponding holes of the frame 126 in order to retain the slider 148 with the frame 126.

The slider 148 further includes a sliding portion 164 extended from the elongated base portion 152. The sliding portion 164 having a length "L2" greater than or equal to the length "L1" of the elongated base portion 152. The sliding portion 164 includes an outer surface 166, opposite to the elongated base portion 152. The sliding portion 164 is configured to slidably engage with the plurality of the shoe pads 131 of the track link 130. More specifically, the outer surface 166 of the slider 148 is configured to engage with an abutment surface 168 defined in the lower surface 134 of each of the plurality of shoe pads 131 of the track link 130. The sliding portion 164 includes a first end 170 and a second end 172 opposite to the first end 170. Referring to the FIG. 2, it may be understood that the sliding portion 164 of the slider 148 may have a curved profile at the first end 170 and the second end 172. The curved profile helps in easier engagement and disengagement between the track link 130 and the slider 148. In the illustrated embodiment, the sliding portion 164 includes a set of wear indictors 174 defined in the outer surface 166 at each of the first end 170 and the second end 172 of the sliding portion 164. In another embodiment, the sliding portion 164 may include the set of wear indicators 174 at one of the first end 170 and the second end 172. The set of wear indicators 174 includes a first wear indicator 176 and a second wear indicator 178 defined in the outer surface 166 of the sliding portion 164.

In the illustrated embodiment, one set of the first wear indicator 176 and the second wear indicator 178, together referred to as a first set of wear indicators 174A, are defined in the outer surface 166 at the first end 170 of the sliding portion 164. Similarly, another set of the first wear indicator 176 and the second wear indicator 178, together referred to as a second set of wear indicators 174B, are defined in the outer surface 166 at the second end 172 of the sliding portion 164. In some embodiments, one of the first and second set of wear indicators 174A, 174B may be defined in the outer surface 166 of the sliding portion 164.

Figure 3:
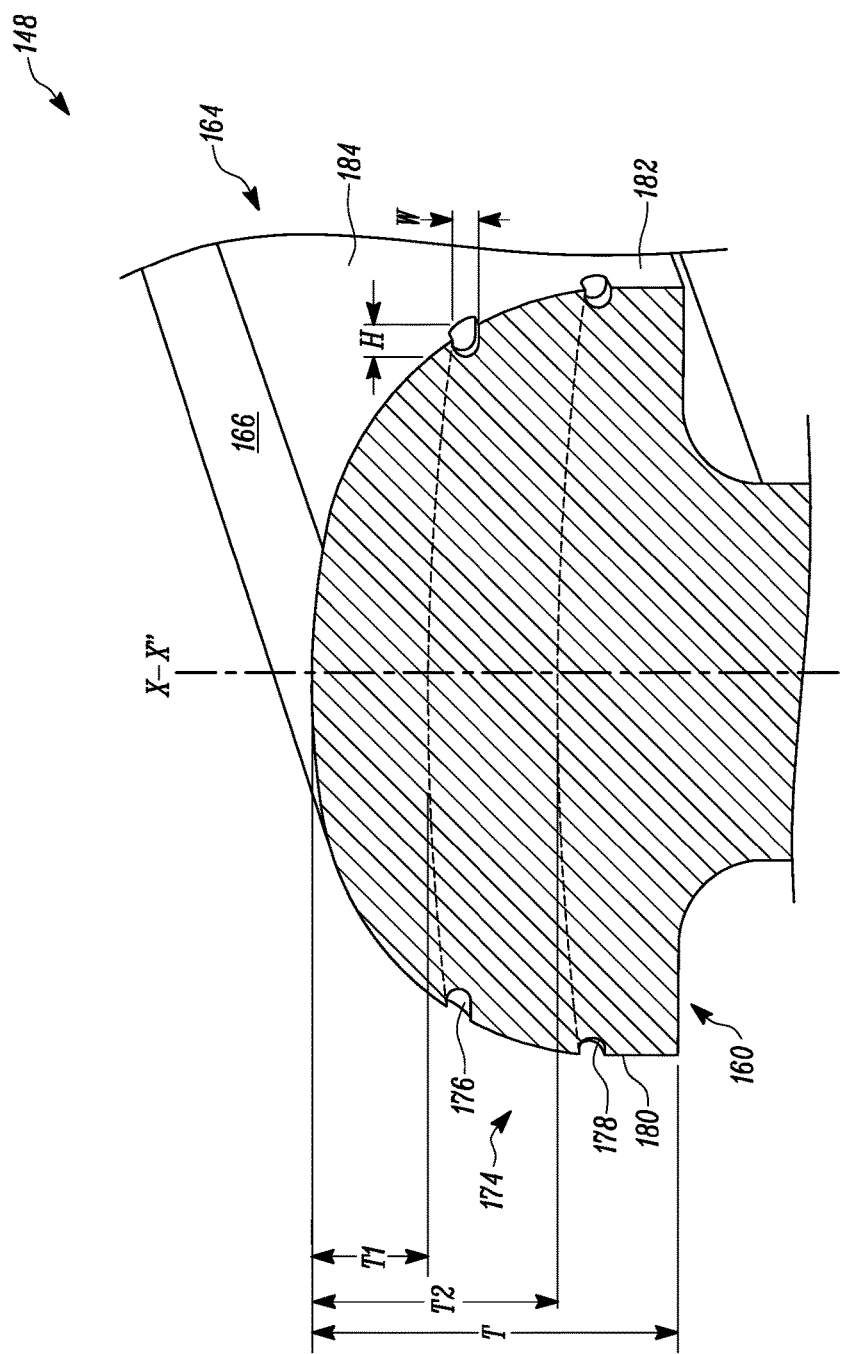
FIG. 3 is a cross-sectional view taken along line A-A' of the slider of FIG. 2 equipped with the wear indicators, according to an embodiment of the present disclosure.

Referring to FIG. 3, a cross-sectional view taken along a line A-A' of the slider 148 of FIG. 2, according to an embodiment of the present disclosure, is illustrated. The outer surface 166 of the sliding portion 164 of the slider 148 includes a first side surface 180 and a second side surface 182 opposite to the first side surface 180. Further, the sliding portion 164 includes an arcuate surface 184 extending between the first side surface 180 and the second side surface 182. The first side surface 180, the second side surface 182 and the arcuate surface 184 are complimentary to the abutment surface 168 of each of the plurality of shoe pads 131 of the track link 130. The first set of wear indicators 174A is defined in at least one of the first side surface 180, the second side surface 182, and the arcuate surface 184 proximal to the first end 170. The second set of wear indicators 174B is defined in at least one of the first side surface 180, the second side surface 182, and the arcuate surface 184 proximal to the second end 172. The first set of wear indicators 174A and the second set of wear indicators 174B are defined in and proximal to the first side surface 180 and the second side surface 182 of the sliding portion 164. The sliding portion 164 of the slider 148 includes a central axis X-X" as shown. The sliding portion 164 has a thickness "T" defined between the top end 160 of the elongated base portion 152 and the outer surface 166 thereof.

The first wear indicator 176 is located in the outer surface 166 of the sliding portion 164 based on a first predefined thickness "T1" measured along the central axis X-X". In the illustrated embodiment, the first wear indicator 176 indicates a partial wear of the sliding portion 164. In an embodiment, the first wear indicator 176 may indicate 50% of the useful life of the first slider 148 is worn out. Accordingly, the first predefined thickness "T1" may be defined as a half of the thickness "T" of the sliding portion 164. The first wear indicator 176 disappears after a prolonged operation of the machine 100, as the outer surface 166 of the sliding portion 164 wears due to relative motion between the outer surface 166 of the sliding portion 164 and the abutment surface 168 of each of the plurality of shoes pads 131. In some embodiments, the first wear indicator 176 may indicate 25% of the useful life of the first slider 148 is worn out. In the present embodiment, the first wear indicator 176 is located in at least one of the first side surface 180 and the arcuate surface 184 based on the first predefined thickness "T1" measured with respect to the arcuate surface 184 along the central axis X-X" of the sliding portion 164. In some embodiments, the first wear indicator 176 may be located in at least one of the second side surface 182 and the arcuate surface 184 based on the first predefined thickness "T1" measured with respect to the arcuate surface 184 along the central axis X-X" of the sliding portion 164.

The second wear indicator 178 is located in the outer surface 166 of the sliding portion 164 at a second predefined thickness "T2" measured along the central axis X-X". The second predefined thickness "T2" is greater than the first predefined thickness "T1". In the illustrated embodiment, the second wear indicator 178 indicates substantial and/or complete wear of the sliding portion 164 of the first slider 148. In an embodiment, the second wear indicator 178 may indicate 100% of the useful life of the slider 148 is worn out. Accordingly, the second predefined thickness "T2" may be defined as the thickness "T" of the sliding portion 164. The second wear indicator 178 disappears after a prolonged operation of the machine 100, as the outer surface 166 of the sliding portion 164 wears due to the relative motion between the outer surface 166 of the sliding portion 164 and the abutment surface 168 of each of the plurality of shoe pads 131. In some embodiments, the second wear indicator 178 may indicate 75-99 percentage of the useful life of the slider 148 is worn out. The first predefined thickness "T1" and the second predefined thickness "T2" may be defined based on various parameters including, but not limited to, material properties of the sliding portion 164 and load acting on the slider 148 by the track link 130 during operation of the machine 100. In the present embodiment, the second wear indicator 178 is located in at least one of the first side surface 180 and the arcuate surface 184 based on the second predefined thickness "T2" measured with respect to the arcuate surface 184 along the central axis X-X" of the sliding portion 164. In some embodiments, the second wear indicator 178 may be located in at least one of the second side surface 182 and the arcuate surface 184 based on the second predefined thickness "T2" measured with respect to the arcuate surface 184 along the central axis X-X" of the sliding portion 164.

In the illustrated embodiment, the set of wear indicators 174 including the first wear indicator 176 and the second wear indicator 178 is defined in and proximal to the first side surface 180 and the second side surface 182 of the sliding portion 164. In some embodiments, the set of wear indicators 174 may be defined on one of the first side surface 180 and the second side surface 182. Although, the sliding portion 164, according to the present embodiment, includes a pair of wear indicators, such as the first wear indicator 176 and the second wear indicator 178, it may be understood that the set of wear indicators 174 may include three or more wear indicators.

In the illustrated embodiment, each of the first wear indicator 176 and the second wear indicator 178 includes a groove 186 having a length "L" extending along the length "L2" of the sliding portion 164 of the slider 148. In an alternate embodiment, the length "L" of the groove 186 may extend along the thickness "T" of the sliding portion 164 of the slider 148. The groove 186 has a width "W" and a depth "H" predefined based on parameters including, but not limited to, a wear rate of the slider 148 and load acting on the slider 148, when the plurality of shoe pads 131 slidably engage with the sliding portion 164 of the slider 148. Accordingly, an annular periphery of the groove 186 defines a rectangular shape for the groove 186. In some embodiments, the length "L" and the width "W" may be equal to define a square shape for the groove 186. Alternately, the groove 186 may be of any other geometric shape, such as a circle, and a polygon. In one embodiment, the groove 186 may be formed in the outer surface 166 of the sliding portion 164 by a machining process. As such, an arcuate surface is formed within the groove 186. In other embodiments, the groove 186 may be casted along with the sliding portion 164 of the slider 148 during manufacturing thereof. The groove 186 further includes a color mark. The color mark may be applied on the arcuate surface of the groove 186. Alternatively, the color mark may be applied at a portion of the arcuate surface of the groove 186. A color of the color mark is different from a color of the outer surface 166 of the sliding portion 164, such that the first and second wear indicators 176, 178 may be visually differentiated from other portion of the outer surface 166 of the sliding portion 164. In various embodiments, each of the first and second wear indicators 176, 178 may be represented by a numeral value, an alphabet, or a combination thereof engraved on the outer surface 166 of the sliding portion 164 of the slider 148.

Figure 4:
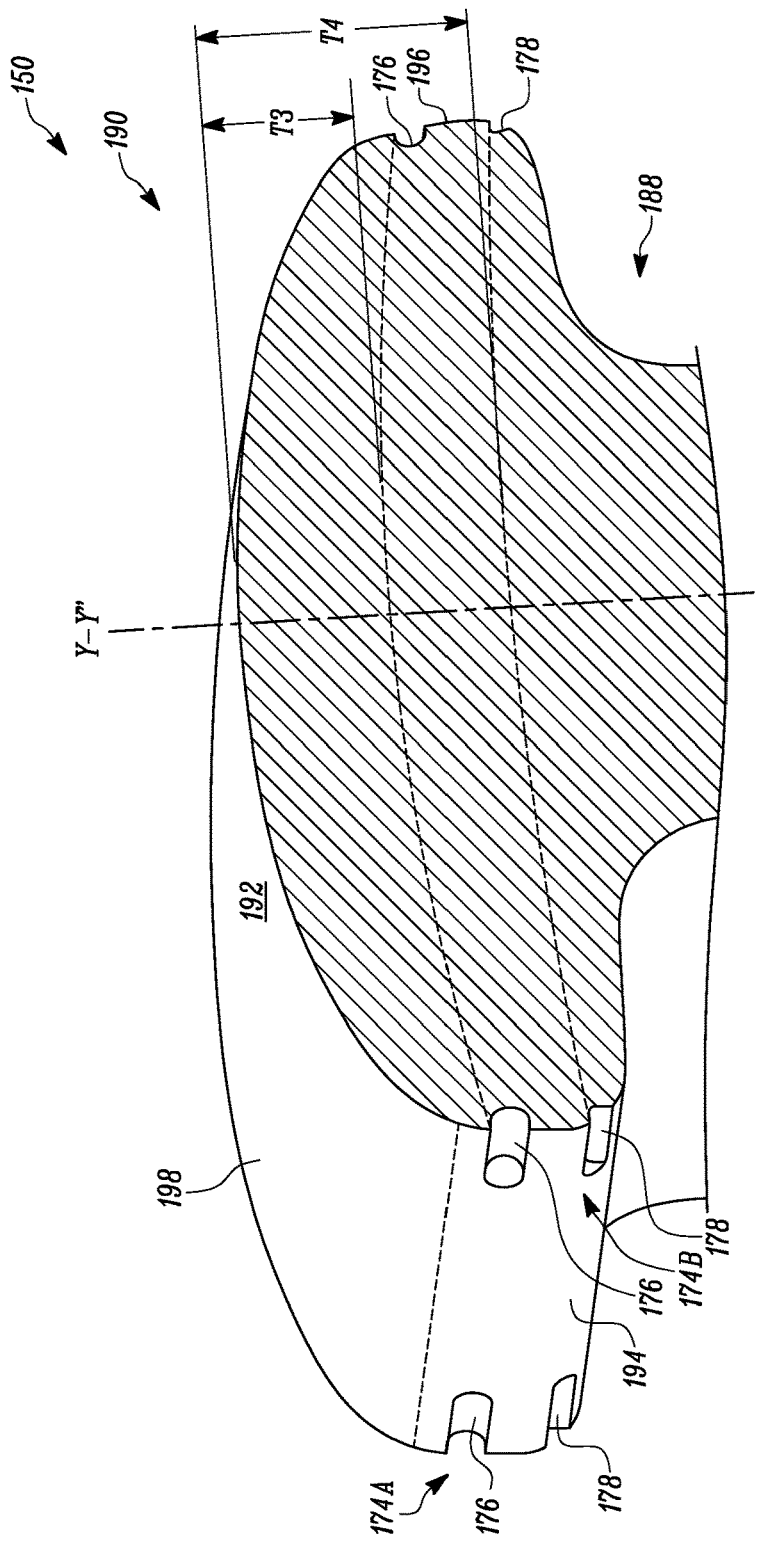
FIG. 4 is a cross-sectional view of a slider equipped with wear indicators, according to another embodiment of the present disclosure.

Referring to FIG. 4, a cross-sectional view of one of the set of second sliders 150 equipped with the set of wear indicators 174, according to another embodiment of the present disclosure, is illustrated. Construction and description of each of the set of second sliders 150 is similar to the aforesaid construction and structure of the slider 148. Hence, all or some of the constructional elements of each of the set of second sliders 150 is omitted for sake of description of the present disclosure. Similar to the slider 148, the second slider 150 includes an elongated base portion 188 and a sliding portion 190 extending from the elongated base portion 188. The sliding portion 190 includes an outer surface 192, which in turn includes a first side surface 194, a second side surface 196 opposite to the first side surface 194, an arcuate surface 198 extending between the first side surface 194 and the second side surface 196. The sliding portion 190 includes the set of wear indictors 174 defined in the outer surface 192 of the sliding portion 190. The set of wear indicators 174 includes the first wear indicator 176 and the second wear indicator 178 defined in the outer surface 192 of the sliding portion 190. The first wear indicator 176 and the second wear indicator 178 are located in at least one of the first side surface 194, the second side surface 196 and the arcuate surface 198 based on a first predefined thickness "T3" measured with respect to the arcuate surface 198 along a central axis Y-Y" of the sliding portion 190. Similarly, the second wear indicator 178 is located in at least one of the first side surface 194, the second side surface 196, and the arcuate surface 198 based on a second predefined thickness "T4" measured with respect to the arcuate surface 198 along the central axis Y-Y" of the sliding portion 164. The second predefined thickness "T4" is greater than the first predefined thickness "T3".

INDUSTRIAL APPLICABILITY

The present disclosure relates to the plurality of sliders 144 coupled to the frame 126 of the track assembly 102. The plurality of sliders 144 of the present disclosure may be applicable to any track-type mobile machine. In one embodiment, the plurality of sliders 144 may be particularly applicable to heavy duty machines, such as the Electric Rope Shovel, in which a majority of wear occurs at the sliding portion 164 of the slider 148 as opposed to the shoe pads 131. The slider 144 includes the set of wear indicators 174, including the first wear indicator 176 and the second wear indicator 178 that assist an operator or a service personal to take decision on maintenance or servicing of the track assembly 102 as desired. For example, a new slider maybe be ordered or servicing may be scheduled in advance of failure of the slider 144 to reduce down time of the machine 100. This may be particularly important for expensive machines that operate around the clock, where downtime of the machine 100 is costly to the owner. Further, the first wear indicators 176 and the second wear indicators 178 include the color mark that is different from the color of the sliding portions 164 that aids in visual inspection of the extent of wear of the plurality of sliders 144.

Figure 5:
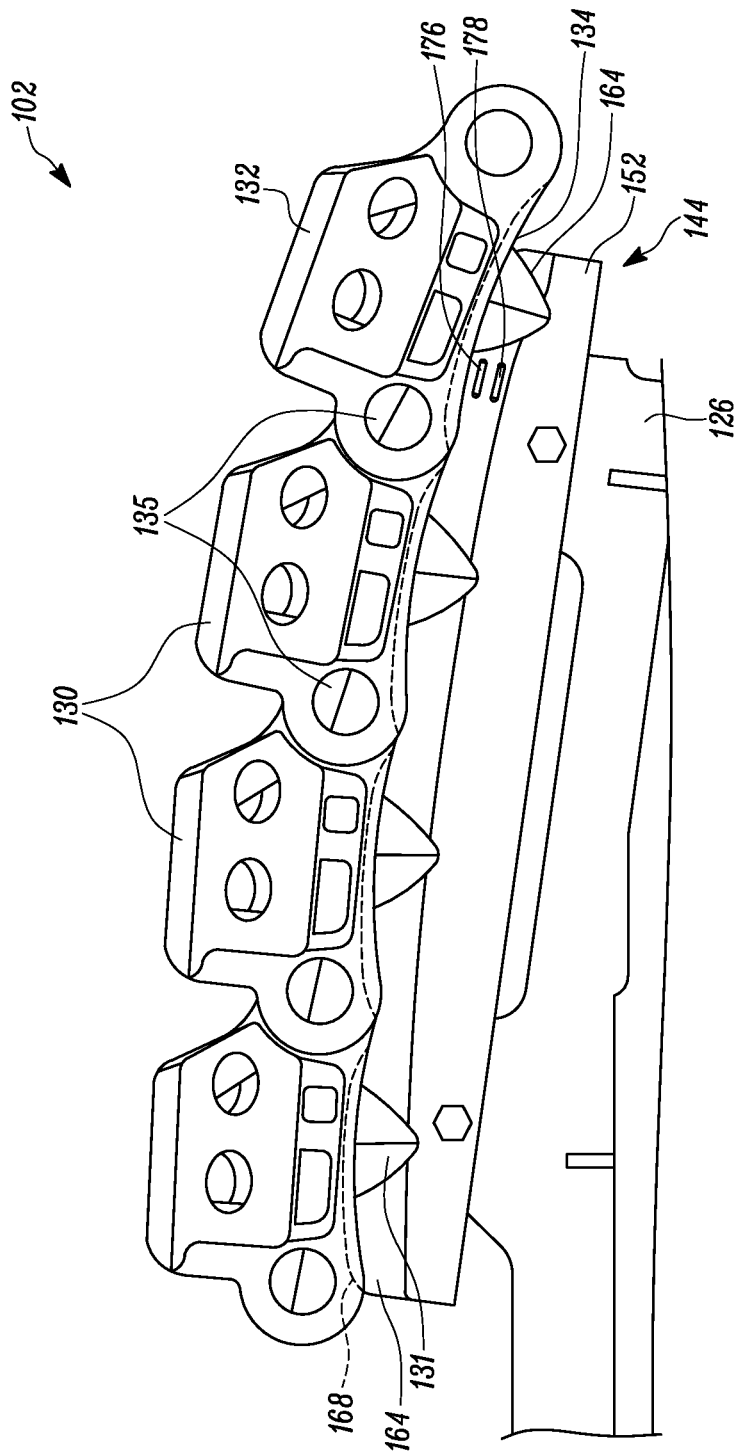
FIG. 5 is an enlarged view of a portion B of the track assembly of FIG. 1 depicting a track link of the track assembly is in sliding engagement with the slider of FIG. 3, according to an embodiment of the present disclosure.

Referring to FIG. 5, an enlarged view of a portion B of the track assembly 102 of FIG. 1, according to an embodiment of the present disclosure, is illustrated. More specifically, a portion of the track link 130 engaging with the slider 148 is shown. In the illustrated embodiment, the length "L2" of the sliding portion 164 of the slider 148 is designed in such a way that the sliding portion 164 of the slider 148 engages with at least four shoe pads 131 of the track link 130. As such, at least one of the first set of wear indicators 174A and the second set of wear indicators 174B is visible outside of the track assembly 102, when the sliding portion 164 is slidably engaged with the shoe pads 131 of the track link 130. Hence, at least one of the first set of wear indicators 174A and the second set of wear indicators 174B is visible to the operator to indicate wear of the slider 148. The placement of the set of wear indicators 174 is such that the at least one set of the wear indicators is visible when the shoe pads 131 of the track link 130 is engaged with the sliding portion 164 of the slider 148. This further improves the visibility of the set of wear indicators 174, thereby eliminating the need of removing the shoe pads 131 to measure the wear of sliders 144. Thus, without dismantling each of the plurality of shoe pads 131 of the track link 130, the operator may take necessary action to maintenance or service the track assembly 102.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A slider for a track assembly of a machine, the slider comprising:
    an elongated base portion configured to couple to a frame of the track assembly; and
    a sliding portion extending from the elongated base portion, and comprising an outer surface configured to slidably engage with a track link of the track assembly, the sliding portion comprising a set of wear indicators defined in the outer surface thereof, the set of wear indicators comprising:
        a first wear indicator located in the outer surface based on a first predefined thickness measured along a central axis of the sliding portion, wherein the first wear indicator indicates partial wear of the sliding portion; and
        a second wear indicator, distinct from the first wear indicator, located in the outer surface based on a second predefined thickness measured along the central axis of the sliding portion, wherein the second predefined thickness is greater than the first predefined thickness, and wherein the second wear indicator indicates substantial wear of the sliding portion,
    wherein the outer surface of the sliding portion comprises a first side surface, a second side surface opposite to the first side surface, and an arcuate surface that extends between the first side surface and the second side surface, wherein the first side surface, the second side surface, and the arcuate surface are complementary to an abutment surface of a shoe pad of the track link and form at all times external contact surfaces of the sliding portion, the arcuate surface forming at all times an upward facing external contact surface, wherein the second wear indicator is provided in the first side surface, and the first wear indicator is provided only in the arcuate surface, at a height on the sliding portion above the second wear indicator, the first and second wear indicators being vertically aligned with each other in a side view of the slider that shows the first side surface, wherein each of the first wear indicator and the second wear indicator comprises a groove in the sliding portion having a length extending along a length of the sliding portion, the length of the groove being less than the length of the sliding portion, and the length of the sliding portion is set so as to engage said abutment surface of said shoe pad of the track link and at least three additional abutment surfaces that each correspond with one of at least three additional shoe pads respectively, wherein a continuous abutment occurs between the external contact surfaces of the sliding portion and both said first abutment surface and said at least three additional abutment surfaces, wherein said continuous abutment extends from a first vertically extending end surface of the slider to a second vertically extending end surface, and wherein the first and second end surfaces define longitudinal ends of the slider, wherein an entire volume of each said groove of the first wear indicator and the second wear indicator is exposed to outside the sliding portion, and wherein the first wear indicator and the second wear indicator are visible from said side view of the slider.

2. The slider of claim 1, wherein the set of wear indicators is defined at a first end, and a second end opposite to the first end of the sliding portion.

3. The slider of claim 1, wherein each said groove has a width, and a depth predefined based on parameters comprising a wear rate of the slider and a load acting on the slider.

4. The slider of claim 1, wherein each of the first wear indicator and the second wear indicator comprises a color mark, and wherein a color of the color mark is different from a color of the sliding portion.

5. A slider for a track assembly of a machine, the slider comprising:
an elongated base portion configured to couple to a frame of the track assembly; and
a sliding portion extending from the elongated base portion and comprising a first side surface, a second side surface opposite to the first side surface, and an arcuate surface that extends between the first side surface and the second side surface, wherein the first side surface, the second side surface, and the arcuate surface form at all times external contact surfaces of the sliding portion and are configured to slidably engage with a track link of the track assembly, wherein the external contact surfaces of the sliding portion define a continuous surface continuously in contact with the track link from a first longitudinal end of the slider to a second longitudinal end of the slider, wherein the first longitudinal end is defined by a forward facing and vertically extending end face of the slider and the second longitudinal end is defined by a rear facing and vertically extending end face of the slider, and wherein the arcuate surface forms at all times an upward facing external contact surface, the sliding portion comprising:
a first set of wear indicators defined only the arcuate surface; and
a second set of wear indicators defined in at least the first side surface, wherein the first set of wear indicators comprises:
a plurality of first wear indicators located only on the arcuate surface that forms at all times the upward facing external contact surface based on a first predefined thickness measured with respect to the arcuate surface along a central axis of the sliding portion, wherein the first wear indicators indicate partial wear of the sliding portion, and wherein the second set of wear indicators comprises:
a plurality of second wear indicators distinct from the first wear indicators, located on the first side surface based on a second predefined thickness measured with respect to the arcuate surface along the central axis of the sliding portion, wherein the second predefined thickness is greater than the first predefined thickness, and wherein the second wear indicators indicate substantial wear of the sliding portion, wherein, for each of the first set of wear indicators and the second set of wear indicators, respective sets of the first and second wear indicators are vertically aligned with each other in a side view of the slider that shows the first side surface, wherein each of the first wear indicators and the second wear indicators comprises a groove in the sliding portion having a length extending along a length of the sliding portion, the length of the groove being less than the length of the sliding portion, and wherein an entire volume of each said groove of the first wear indicators and the second wear indicators is exposed to outside the sliding portion.

6. The slider of claim 5, wherein at least one of the first set of wear indicators and the second set of wear indicators is visible outside of the track assembly, when the sliding portion is slidably engaged with a shoe pad of the track link.

7. The slider of claim 5, wherein each said groove has a width and a depth predefined based on parameters comprising a wear rate of the slider and a load acting on the slider.

8. The slider of claim 5,
wherein each of the first wear indicators and the second wear indicators comprises a color mark, and
wherein a color of the color mark is different from a color of the sliding portion.

9. A track assembly for a machine, comprising:
a frame;
a track link movable around the frame; and
a slider coupled to the frame, and slidably engaged with a plurality of shoe pads of the track link, the slider comprising:
an elongated base portion configured to couple to the frame; and
a sliding portion extending from the elongated base portion, and comprising an outer surface configured to slidably engage with the track link of the track assembly, the sliding portion comprising a set of wear indicators defined in the outer surface thereof, the set of wear indicators comprising:
a first wear indicator located based on a first predefined thickness measured along a central axis of the sliding portion, wherein the first wear indicator denotes partial wear of the sliding portion; and
a second wear indicator, distinct from the first wear indicator, located based on a second predefined thickness measured along the central axis of the sliding portion, wherein the second predefined thickness is greater than the first predefined thickness, and wherein the second wear indicator indicates complete wear of the sliding portion, wherein the outer surface of the sliding portion comprises a first side surface, a second side surface opposite to the first side surface, and an arcuate surface that extends between the first side surface and the second side surface, wherein the first side surface, the second side surface, and the arcuate surface form at all times external contact surfaces of the sliding portion and are complementary to an abutment surface of a shoe pad of the track link, the arcuate surface forming at all times an upward facing external contact surface, wherein the external contact surfaces of the sliding portion define a continuous surface continuously in contact with the track link from a first longitudinal end of the slider to a second longitudinal end of the slider, and wherein the first longitudinal end is defined by a forward facing and vertically extending end face of the slider and the second longitudinal end is defined by a rear facing and vertically extending end face of the slider, wherein the second wear indicator is provided in the first side surface, and the first wear indicator is provided only in the arcuate surface, at a height on the sliding portion above the second wear indicator, the first and second wear indicators being vertically aligned with each other in a side view of the slider that shows the first side surface, wherein each of the first wear indicator and the second wear indicator comprises a groove in the sliding portion having a length extending along a length of the sliding portion, the length of the groove being less than the length of the sliding portion, and wherein an entire volume of each said groove of the first wear indicator and the second wear indicator is exposed to outside the sliding portion.

10. The track assembly of claim 9, wherein the set of wear indicators is defined at the first end, and a second set of said wear indicators is defined at the second end opposite to the first end of the sliding portion, and wherein at least one set of the sets of wear indicators defined at the first end and the second end of the sliding portion is visible outside of the track assembly, when the sliding portion is slidably engaged with a shoe pad of the track link.

11. The track assembly of claim 9, wherein the groove has a width, and a depth predefined based on parameters comprising a wear rate of the slider and a load acting on the slider.

12. The track assembly of claim 9, wherein each of the first wear indicator and the second wear indicator comprises a color mark, and wherein a color of the color mark is different from a color of the sliding portion.

\* \* \* \* \*